United States Patent
Sakaida

(10) Patent No.: US 8,194,959 B2
(45) Date of Patent: Jun. 5, 2012

(54) MEDICAL IMAGE PART RECOGNITION APPARATUS AND MEDICAL IMAGE PART RECOGNITION PROGRAM

(75) Inventor: Hideyuki Sakaida, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 1026 days.

(21) Appl. No.: 11/798,705

(22) Filed: May 16, 2007

(65) Prior Publication Data

US 2007/0269089 A1    Nov. 22, 2007

(30) Foreign Application Priority Data

May 19, 2006    (JP) ................................. 2006-140041

(51) Int. Cl.
- G06K 9/00    (2006.01)
- G06K 9/62    (2006.01)
- G06K 9/46    (2006.01)
- G06K 9/64    (2006.01)
- G06K 9/72    (2006.01)

(52) U.S. Cl. ........ 382/131; 382/128; 382/130; 382/132; 382/156; 382/190; 382/224; 382/227

(58) Field of Classification Search .................. 382/131, 382/128, 130, 132, 156, 190, 224, 227
See application file for complete search history.

(56) References Cited

U.S. PATENT DOCUMENTS

| | | | |
|---|---|---|---|
| 5,331,550 A * | 7/1994 | Stafford et al. | 382/128 |
| 5,926,568 A * | 7/1999 | Chaney et al. | 382/217 |
| 6,816,571 B2 * | 11/2004 | Bijjani et al. | 378/57 |
| 6,990,171 B2 * | 1/2006 | Toth et al. | 378/16 |
| 7,155,042 B1 * | 12/2006 | Cowan et al. | 382/128 |
| 7,167,583 B1 * | 1/2007 | Lipson et al. | 382/147 |
| 7,876,938 B2 * | 1/2011 | Huang et al. | 382/128 |
| 2004/0147840 A1 * | 7/2004 | Duggirala et al. | 600/437 |
| 2005/0251013 A1 * | 11/2005 | Krishnan et al. | 600/407 |
| 2006/0110036 A1 * | 5/2006 | Luo et al. | 382/170 |
| 2007/0116337 A1 * | 5/2007 | Toth et al. | 382/128 |

FOREIGN PATENT DOCUMENTS

| | | |
|---|---|---|
| JP | 2002-253539 A | 9/2002 |
| JP | 2003-010166 A | 1/2003 |
| JP | 2003275194 A | 9/2003 |
| JP | 2005034473 A | 2/2005 |
| WO | WO 2004095371 A1 * | 11/2004 |

OTHER PUBLICATIONS

Kobashi, et al. "Knowledge-based Organ Identification from CT Images." Pattern Recognition. 28.4 (1995): 475-491. Print.*
Touhami, et al. "Fully Automatic Kidneys Detection in 2D CT Images: A Statistical Approach." Lecture Notes in Computer Science. 3749. (2005): 262-270. Print.*

(Continued)

*Primary Examiner* — Michael A Newman
(74) *Attorney, Agent, or Firm* — Sughrue Mion, PLLC

(57) ABSTRACT

An apparatus for efficiently recognizing a part of a body shown in each of plural axial images for one series of axial images obtained by imaging an object to be inspected with a modality. The apparatus includes: apart determining unit for tentatively determining a part of a body shown in each of plural axial images; and a part correcting unit for correcting the part tentatively determined for at least one axial image by the part determining unit, based on information on the plural axial images.

12 Claims, 8 Drawing Sheets

OTHER PUBLICATIONS

Brown, et al. "Method for Segmenting Chest CT Image Data Using an Anatomical Model: Preliminary Results." IEEE Transactions on Medical Imaging. 16.6 (1997): 828-839. Print.*

Kobashi et al. "Knowledge-based Organ Identification from CT Images." Pattern Recognition. 28.4 (1995): 475-491. Print.*

Defrise, et al. "Exact and Approximate Rebinning Algorithms for 3-D PET Data." IEEE Transactions in Medical Imaging. 16.2 (1997): 145-158. Print.*

Japanese Office Action corresponding to Japanese Patent Application No. 2006-140041, dated Jul. 12, 2011.

* cited by examiner

| AMOUNT OF AIR | 0%~10% | 10%~40% | 40%~80% | 80%~100% |
|---|---|---|---|---|
| HEAD | 0.9 | -1.0 | -1.0 | -1.0 |
| CHEST | -1.0 | 0.0 | 0.8 | 1.0 |
| ABDOMEN | -1.0 | 0.8 | -0.2 | -1.0 |
| LEG | 1.0 | -1.0 | -1.0 | -1.0 |

UPPER SECTION

LOWER SECTION

☒ : Head
☐ : Neck
⧄ : Chest
☰ : Abdomen

SLICE NUMBER:

| | 1 | 2 | 3 | 4 | 5 | 6 | 7 | 8 | 9 | 19 | 11 | 12 | 13 | 14 | 15 | PART |
|---|---|---|---|---|---|---|---|---|---|---|---|---|---|---|---|---|
| | 0.0 | 0.0 | 0.7 | 0.3 | 0.8 | 0.2 | 0.6 | 0.7 | 0.9 | 1.3 | 1.5 | 2.1 | 1.6 | 1.4 | 1.8 | Head |
| | 0.2 | 0.5 | 0.0 | 0.0 | 0.0 | 0.7 | 0.0 | 0.9 | 0.4 | 0.7 | 0.4 | 0.7 | 0.9 | 1.2 | 1.1 | Neck |
| | 0.3 | 0.9 | 0.6 | 0.7 | 0.4 | 0.0 | 0.5 | 0.0 | 0.0 | 0.3 | 0.0 | 0.3 | 0.7 | 1.1 | 1.3 | Chest |
| | 1.0 | 1.4 | 1.1 | 1.7 | 1.3 | 0.6 | 0.9 | 0.3 | 0.7 | 0.0 | 0.2 | 0.0 | 0.0 | 0.0 | 0.0 | Abdomen |

SLICE NUMBER:

| | 1 | 2 | 3 | 4 | 5 | 6 | 7 | 8 | 9 | 19 | 11 | 12 | 13 | 14 | 15 | PART |
|---|---|---|---|---|---|---|---|---|---|---|---|---|---|---|---|---|
| | 0.0 | 0.0 | 0.0 | 0.7 | 0.3 | 0.8 | 0.2 | 0.6 | 0.7 | 0.9 | 1.3 | 1.5 | 1.6 | 1.4 | 1.8 | Head |
| | 0.0 | 0.5 | 0.0 | 0.0 | 0.7 | 1.0 | 0.8 | 1.1 | 1.0 | 1.4 | 1.3 | 2.0 | 0.9 | 1.2 | 1.1 | Neck |
| | 0.2 | 0.9 | 1.1 | 0.7 | 0.4 | 0.7 | 1.5 | 0.8 | 1.1 | 1.3 | 1.4 | 1.6 | 0.7 | 1.1 | 1.3 | Chest |
| | 0.3 | 1.6 | 2.0 | 2.8 | 2.0 | 1.0 | 1.6 | 1.8 | 1.5 | 1.1 | 1.5 | 1.4 | 0.0 | 0.0 | 0.0 | Abdomen | ns
MEDICAL IMAGE PART RECOGNITION APPARATUS AND MEDICAL IMAGE PART RECOGNITION PROGRAM

BACKGROUND OF THE INVENTION

1. Field of the Invention

The present invention relates to a medical image part recognition apparatus for performing part recognition of a body shown in a medical image based on image data acquired by a medical imaging modality, and a medical image part recognition program to be used in the apparatus.

2. Description of a Related Art

Recent years, many medical images showing the interiors of living bodies have been used in medical diagnoses, and, in order to acquire such medical images, various technologies and apparatuses (modalities) such as an X-ray imaging apparatus, an X-ray CT (computed tomography) apparatus, a US (ultrasonic) diagnostic apparatus, an MRI (magnetic resonance imaging) apparatus, and a PET (positron emission tomography) apparatus are widely used. Many of the apparatuses are digitalized, and diagnostic information processing systems within hospitals and so on are being constructed. Further, among the imaging technologies, CT and MRI have achieved significant results in detection and evaluation of lesion parts in living bodies because they can acquire and display axial images of a living body at relatively short intervals. Here, an axial image refers to a tomographic image that shows a surface perpendicular or nearly perpendicular to the body axis of an object to be inspected or a so-called cross sectional surface. Hereinafter, the axial image is also simply referred to as "slice image".

At the time of tomographic imaging for CT inspection or the like, not only one part (e.g., only the chest or the abdomen) is necessarily imaged, but also imaging is often performed over plural parts (e.g., from the chest to the abdomen, from the head to the chest, or the like) in one inspection. On the other hand, thus obtained one series of slice images are typically displayed on a screen sequentially along a direction in which the imaging has been performed. Accordingly, a doctor, who observes the slice images and makes a diagnosis, must begin image interpretation from seeking an image showing the part as an object of the diagnosis. However, one series of images typically contains a thousand and several hundreds of images to several thousands of images, and therefore, significant effort and burden are imposed on the image interpretation doctor. On this account, an apparatus, system, or the like is desired that can promptly display an image showing a desired part among an enormous amount of images with less effort.

As a related technology, Japanese Patent Application Publication JP-P2002-253539A discloses a medical image identification system for enabling efficient management of an enormous amount of medical images by automatically extracting imaging attribute information of imaging apparatus, part, imaging orientation, and so on from medical images by image processing, and adding the information to management information. The medical image identification system is a system for storing and managing medical images, and includes means for classifying an input image, template image storing means for storing template images on categories to be identified with respect to the classification, means for selecting template images of plural categories as candidates of identification by using the classification result of the input image, image identifying means for comparing the selected template images with the input image and determining the category of the template image that is the best match, and means for adding manage information of the template image to manage information of the input image. That is, according to JP-P2002-253539A, the imaging part or the like of the input image is determined by classifying the input image based on the size of the input image, the number of rectangular areas in the input image, and so on, selecting template images of plural categories based on the classification, extracting one that matches the gray scale information and the mosaic image of the input image from the selected template images, and providing the management information (e.g., the imaging part) that has been provided to the template image as management information of the input image.

However, one medical image does not always show only one part. For example, plural parts are often shown in the way that the chest is shown in a portion of an image and the abdomen is shown in another portion of the image. Despite this, JP-P2002-253539A discloses nothing about part recognition for images that show plural parts.

Further, Japanese Patent Application Publication JP-P2003-10166A discloses an image processing apparatus for performing optimum image processing on image data according to imaging direction and/or imaging part even when imaging information representing the imaging direction and/or imaging part is not provided to the image data. The image processing apparatus includes determining means for determining whether or not imaging information representing imaging direction and/or imaging part at the time of taking a medical image is provided to medical image data representing the medical image, recognizing means for recognizing the imaging direction and/or imaging part based on the medical image data when the imaging information is not provided, and providing means for providing to the medical image data the recognition result as the imaging information. According to JP-P2003-10166A, recognition of an imaging part is performed by utilizing an intrinsic image created by using plural image data in advance.

However, in JP-P2003-10166A, the part recognition only for one image is performed.

SUMMARY OF THE INVENTION

Accordingly, in view of the above-mentioned points, a purpose of the present invention is to provide an apparatus for efficient recognizing a part of a body shown in each of plural axial images for one series of axial images obtained by imaging an object to be inspected with a modality of CT, MRI, or the like, and a program to be used in the apparatus.

In order to achieve the above-mentioned purpose, a medical image part recognition apparatus according to one aspect of the present invention is an apparatus for recognizing a part of a body shown in each of plural axial images based on image data representing one series of axial images obtained by imaging an object to be inspected, and the apparatus includes: part determining means for tentatively determining a part of a body shown in each of plural axial images; and part correcting means for correcting the part tentatively determined for at least one axial image by the part determining means, based on information on the plural axial images.

Further, a medical image part recognition program according to one aspect of the present invention is a program embodied on a computer readable medium and to be used in an apparatus for recognizing a part of a body shown in each of plural axial images based on image data representing one series of axial images obtained by imaging an object to be inspected, and the program allows a CPU to execute the procedures of: (a) tentatively determining a part of a body shown in each of plural axial images; and (b) correcting the part tentatively determined for at least one axial image at procedure (a), based on information on the plural axial images.

According to the present invention, the part shown in each of plural axial images is corrected based on information on the plural axial images, i.e., three-dimensional information of the object represented by the set of axial images after part recognition is performed on each of the plural axial images, and therefore, accurate part recognition can be efficiently performed.

DESCRIPTION OF THE PREFERRED EMBODIMENTS

Figure 1:
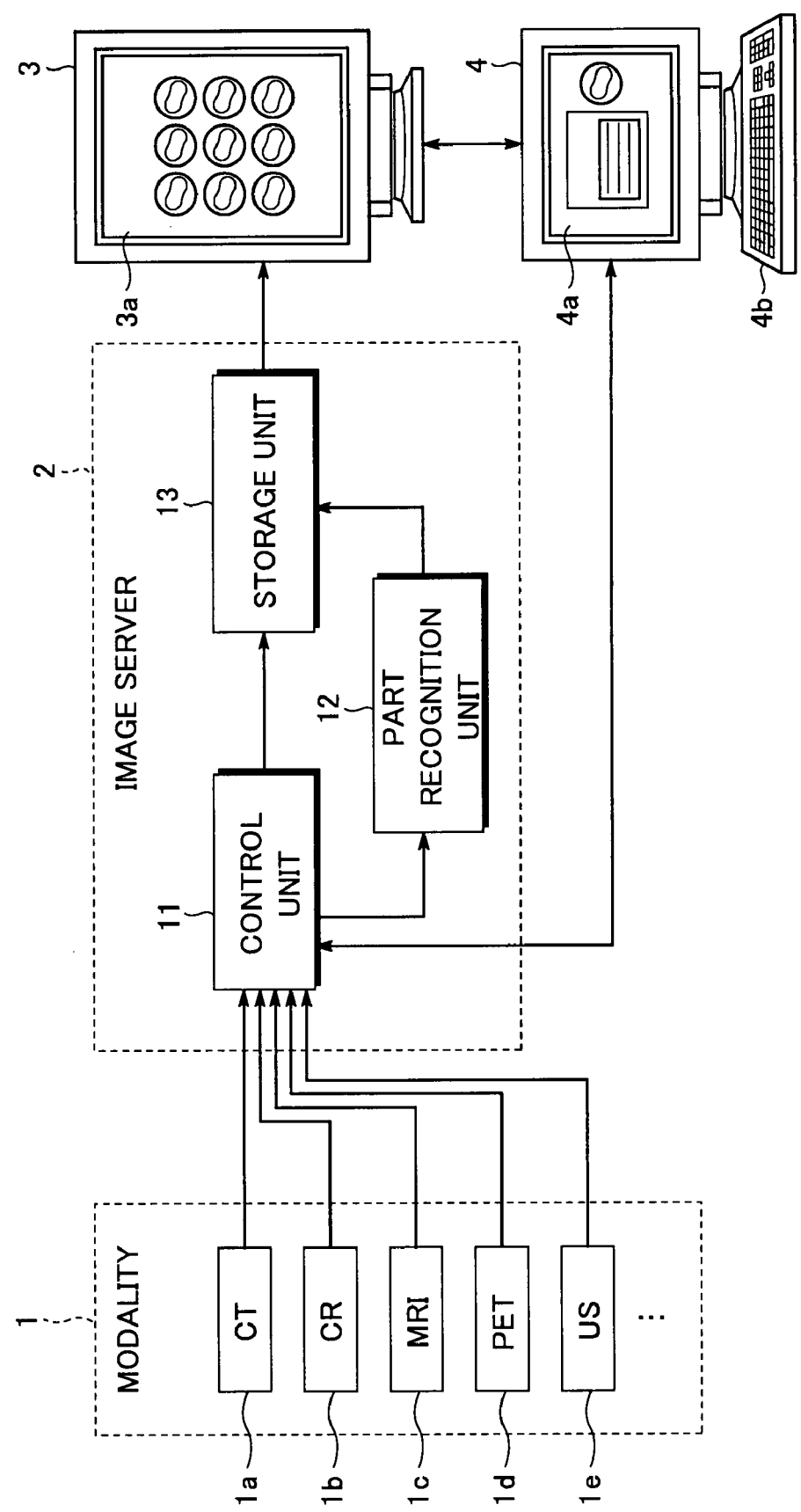
FIG. 1 is a block diagram showing a configuration of a medical image imaging system containing a medical image part recognition apparatus according to the first embodiment of the present invention.

Hereinafter, preferred embodiments of the present invention will be explained in detail by referring to the drawings. The same reference numerals are assigned to the same component elements and the explanation thereof will be omitted.

FIG. 1 is a block diagram showing a configuration of a medical image imaging system containing a medical image part recognition apparatus according to the first embodiment of the present invention. The medical image imaging system includes a modality 1 for obtaining medical images by performing imaging inspection of an object to be inspected, an image server 2, an image display terminal 3, and an image interpretation terminal 4. These devices 1-4 are compliant with the DICOM (Digital Imaging and Communications in Medicine) standard.

The modality 1 includes a medical image imaging apparatus such as a CT apparatus 1a, a CR (computed radiography) apparatus 1b, an MRI apparatus 1c, a PET apparatus 1d, and a US (ultrasonic) diagnostic apparatus 1e, and so on. These modalities 1a-1e generate image data by performing imaging inspection and output the data with image supplementary information to the image server 2.

The image server 2 is a PACS (Picture Archiving and Communication System) server for storing and managing image data obtained by the modality 1. The image server 2 has a medical image part recognition function and operates not only as a typical image server (for storing image data and so on) but also as a medical image part recognition apparatus. The image server 2 outputs image data to the image display terminal 3 according to the request of the image interpretation terminal 4, which will be described later.

As shown in FIG. 1, the image server 2 has a control unit 11, a part recognition unit 12, and a storage unit 13. The control unit 11 and the part recognition unit 12 are configured by a CPU (central processing unit) and programs, for example.

The control unit 11 allows the storage unit 13 to store the image data outputted from the modality 1. Further, the control unit 11 confirms the orientation of the images (axial, coronal, sagittal, or the like) represented by the inputted image data, and also outputs the image data to the part recognition unit 12 when the orientation is axial. The orientation of images is acquired from image incidental information provided with DICOM tag (0020,0037): Image Orientation (Patient) or (0020,0020): Patient Orientation.

The part recognition unit 12 recognizes which part of the object is shown in each axial image based on plural axial images (hereinafter, also referred to as "slice images") represented by one series of image data. Then, the unit generates information (part information) containing recognition results (parts), associates the information with the image data, and allows the storage unit 13 to store the data. The parts may be expressed by a character string of "head", "neck", "chest", or the like, or expressed by an integral value that has been coded in advance of 1: head, 2: neck, 3: chest, or the like.

The storage unit 13 is, for example, a hard disk drive built in the image server 2, and stores image data and image incidental information thereof, part information generated by the part recognition unit 12, programs for operating the part recognition unit 12, and soon under control of the control unit 11. As a recording medium, not only the hard disk, but also an MO, an MT, a RAM, a CD-ROM, a DVD-ROM, or the like may be used. In this case, a drive unit for driving those recording media is built in the image server 2 or externally connected to the image server 2.

The image display terminal 3 is a terminal device on which inspection images are displayed and has a high-definition display. Plural axial images are schematically shown on a screen 3a of the image display terminal 3 shown in FIG. 1.

The image interpretation report server 4 is a device to be used by a user (image interpretation doctor) for generating image interpretation reports and so on while referring to inspection images displayed on the image display terminal 3, and includes a screen 4a for displaying image interpretation reports, an input device 4b such as a keyboard, and so on.

Next, the configuration and operation of the part recognition unit 12 shown in FIG. 1 will be explained with reference to FIGS. 2-4.

Figure 2:
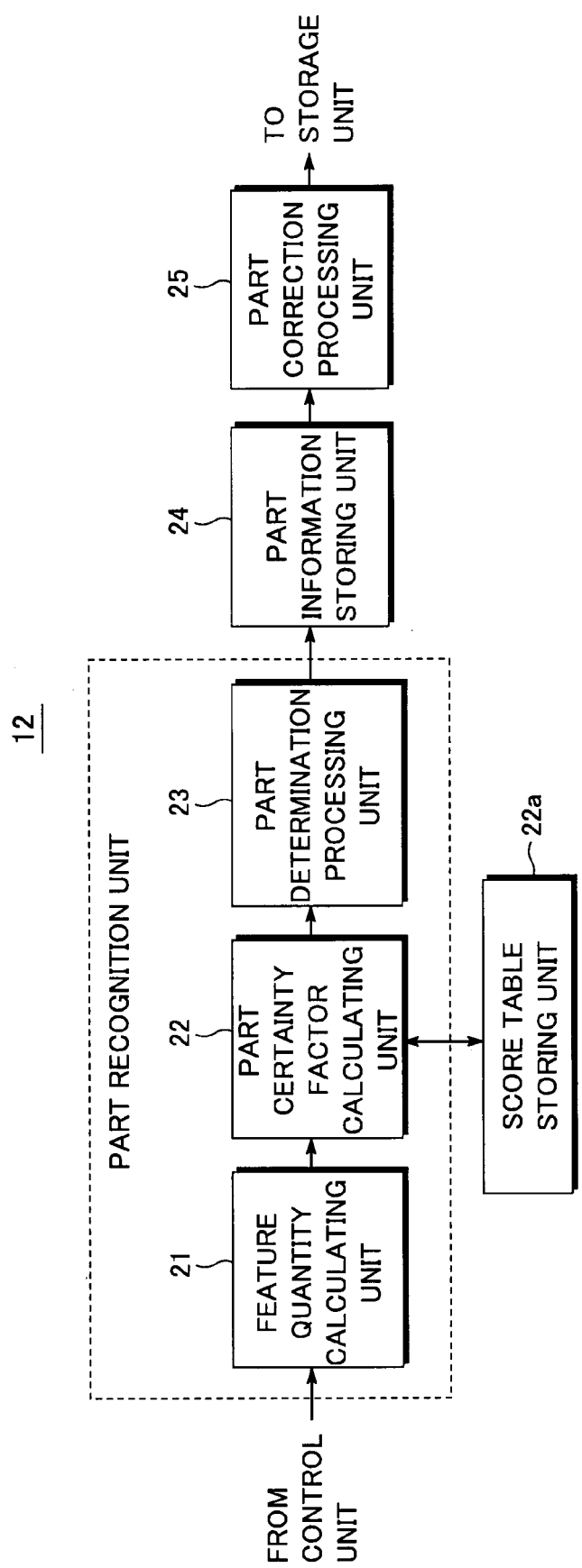
FIG. 2 is a block diagram showing functions of the part recognition unit shown in FIG. 1.

FIG. 2 is a block diagram showing functions of the part recognition unit 12 shown in FIG. 1. As shown in FIG. 2, the part recognition unit 12 includes a feature quantity calculating unit 21, a part certainty factor calculating unit 22, a score table storing unit 22a, a part determination processing unit 23, a part information storing unit 24, and a part correction processing unit 25. Among the units, the feature quantity calculating unit 21, the part certainty factor calculating unit 22, and the part determination processing unit 23 form a part determination section, and operate to tentatively determine the represented part for each slice image. Further, the part correction processing unit 25 operates to correct the part tentatively determined for each slice image based on part information of plural slice images. The part information of plural slice images will be described as below.

Figure 3:
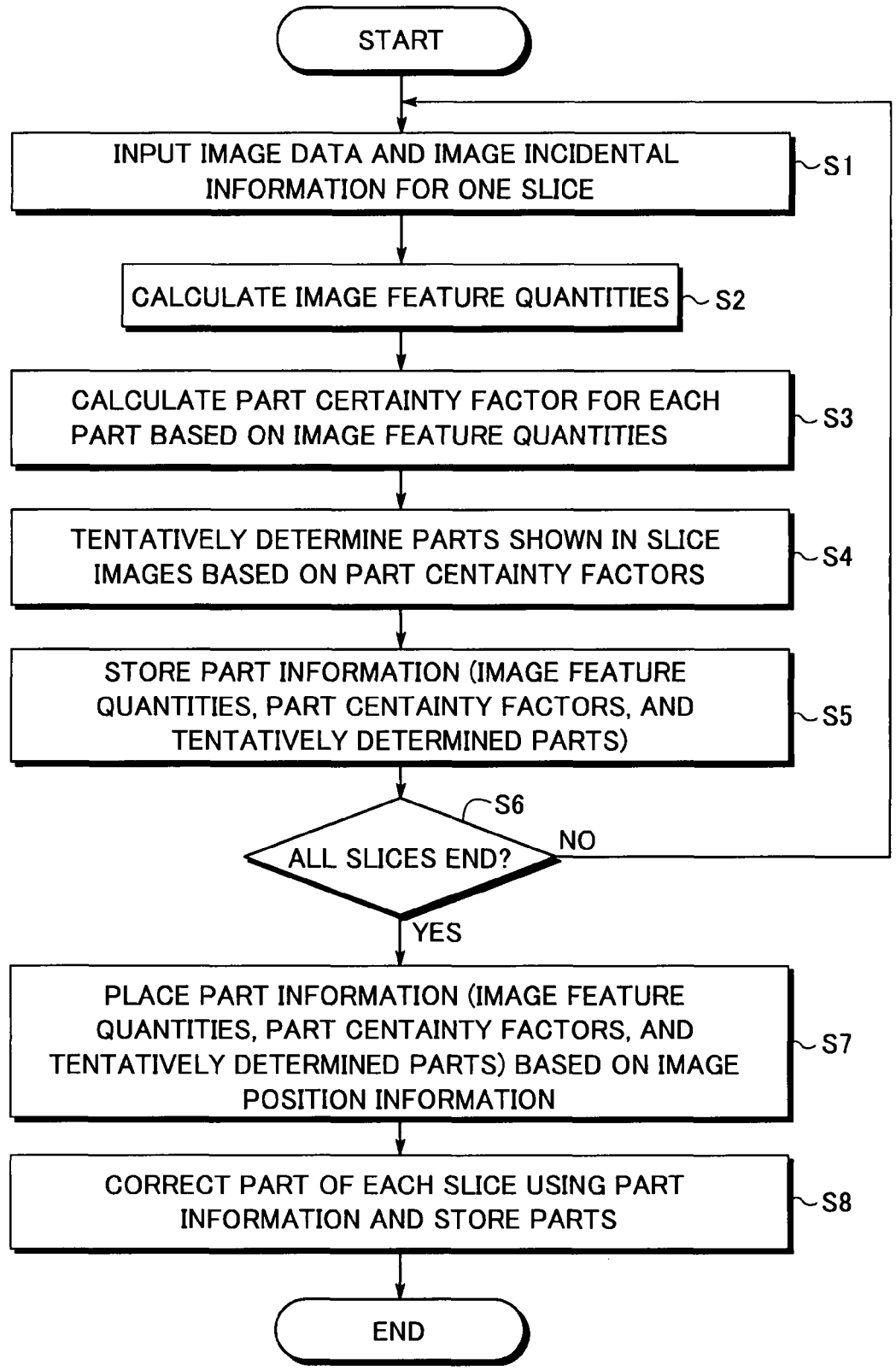
FIG. 3 is a flowchart showing the operation of the part recognition unit shown in FIG. 1.

FIG. 3 is a flowchart showing the operation of the part recognition unit 12. When the image data determined to represent axial images in the control unit 11 (FIG. 1) is inputted to the part recognition unit 12, the part recognition operation as described below is started.

At step S1, image data and the image incidental information thereof are inputted for each slice to the feature quantity calculating unit 21. Here, the image incidental information includes information representing image orientation ((0020, 0037): Image Orientation (Patient) or (0020,0020): Patient Orientation), information representing the spacing of pixels ((0028,0030): Pixel Spacing), information representing the thickness of a slice ((0018,0050): Slice Thickness), information representing the number of pixels contained in one row or column ((0028,0010): Rows and (0028,0011): Columns), information representing the three-dimensional coordinates in the upper left position of an image ((0020,0032): Image position (Patient)) and so on. Here, the contents in the parentheses express DICOM tags and attribute names of the respective information.

At step S2, the feature quantity calculating unit 21 calculates a feature quantity for one slice. Here, the feature quantity is obtained by converting the feature of the body represented by the slice image into numerical values. The feature quantity is calculated based on the shape of the body represented in the slice image as shown in the following (A), for example. Further, when the value of each pixel data (i.e., pixel brightness) corresponds to the body property (tissue property or the like), the feature quantity may be calculated according to the value as shown in the following (B) or (C). For example, the value of pixel data in a CT image is determined by a CT value, and the CT value is a physical quantity representing the amount of radiation transmitted through the body. The CT value of water is 0HU, the CT value in the air region is about −1000HU, and the CT value in the bone region is about 250HU to 300HU.

(A) Degree of Circularity of Entire Body

The degree of circularity ρ is calculated by the following equation (1) by using the area S of a target region and the length L around the region.

$$\Sigma = 4\pi S/L^2 \quad (1)$$

The shape of the target region becomes closer to a perfect circle, the degree of circularity ρ becomes closer to 1.0, and the shape of the target region becomes farther from the perfect circle (e.g., the ellipticity becomes farther from 1), the degree of circularity ρ becomes smaller. For example, in the case where the target region is the head, the degree of circularity is relatively high. Contrary, in the case where the target region is the chest or abdomen, the degree of circularity is relatively low.

(B) Feature Quantity of Air Region: (Number of Pixels Having CT Values Representing Air Region)/(Number of Pixels of Entire Body)

For example, in the case where the target region is the chest, the air region is relatively wide because of the existence of lungs. Contrary, in the case where the target region is the head, the air region is nearly zero.

(C) Feature Quantity of Bone Region: (Number of Pixels Having CT Values Representing Bone Region)/(Number of Pixels of Entire Body)

For example, in the case where the target region is the abdomen, the bone region relative to the entire body is a relatively small range. Contrary, in the case where the target region is the leg, the bone region occupies the major part relative to the entire body.

Then, at step S3, the part certainty factor calculating unit 22 calculates a part certainty factor based on the feature quantity calculated by the feature quantity calculating unit 21. Here, the part certainty factor is obtained by converting the likelihood that the target part is "certain part" (the likelihood of "head", the likelihood of "chest", or the like) into numerical values. In the embodiment, the part certainty factor is calculated by using a score table that has been prepared in advance.

Figures 4, 5:
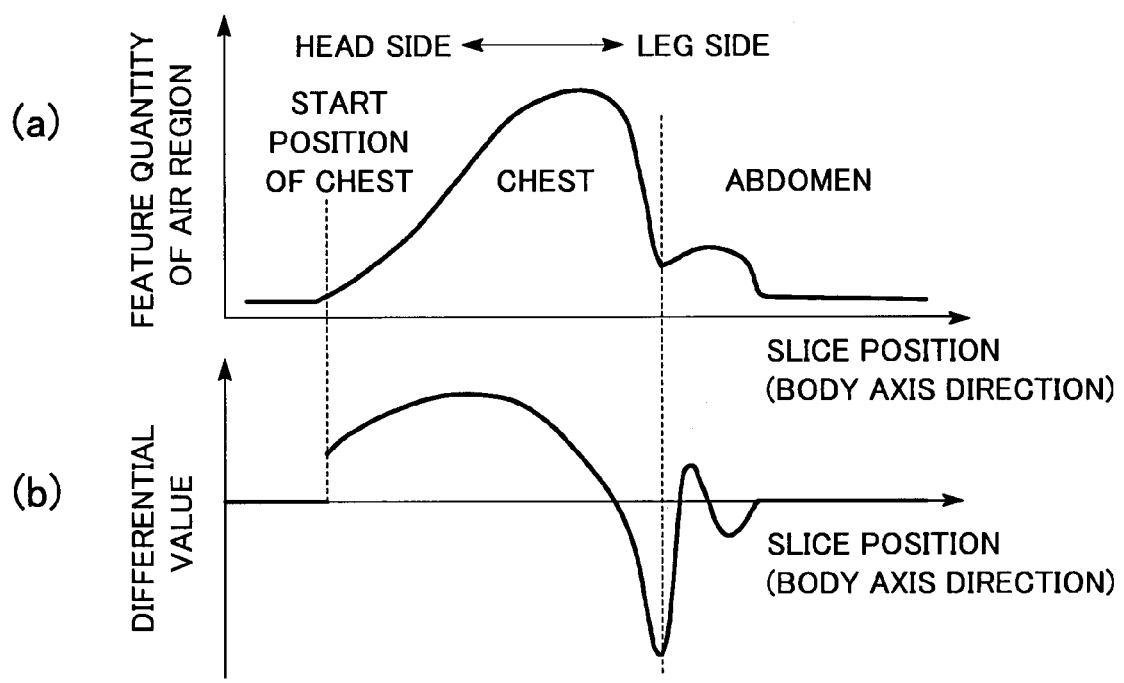
FIG. 4 shows a part certainty score table using feature quantities of air region.
FIG. 5 shows feature quantities of air region and differential values thereof.

FIG. 4 shows an example of score table to be used for calculation of part certainty factor. The score table is used when the likelihood of "head", the likelihood of "chest", the likelihood of "abdomen", and the likelihood of "leg" based on the value of the feature quantity of air region (the amount of air). In addition, "pelvis" may be used as a part item. Further, items (e.g., "head and neck" or "chest and abdomen") indicating the boundary between two adjacent parts (boundary region) and the region of a mixture of plural parts (mixture region, e.g., the head and neck or the chest and abdomen) may be used.

For example, when the feature quantity of air region of a body represented by a CT image is 60%, by referring to the field of "40%-80%" containing 60% in the score table, it is found that the score of the likelihood of "head" of the body is "−1.0", the score of the likelihood of "chest" is "0.8", the score of the likelihood of "abdomen" is "−0.2", and the score of the likelihood of "leg" is "−1.0".

Such score table is created for each feature quantity and stored in the score table storing unit 22*a*. The score table may be statistically created or intentionally created based on experiences of users (doctors) or the like.

The part certainty factor calculating unit 22 obtains the score of the likelihood of each "part" with respect to each feature quantity by referring to the score table, and adds the scores with respect to each part. Thus obtained sum of scores with respect to each part is the part certainty factor.

With reference to FIG. 3 again, at step S4, the part determination processing unit 23 tentatively determines the part with the largest value of the part certainty factors obtained at step S3 as the part of the body shown in the slice image. When there are plural parts with larger values and the difference between them is within a predetermined range (e.g., within 10%), both parts may be adopted. For example, the part certainty factors of the chest and the abdomen are larger, the part of the slice is determined to be "chest" or "abdomen". Alternatively, when an item indicating the boundary region or mixture region (e.g., "chest and abdomen") is used, it may be adopted.

At step S5, the part information storing unit 24 stores the feature quantities obtained at step S2, the part certainty factors obtained at step S3, and the part tentatively determined at step S4 as part information of the slice images (information on parts). All feature quantities are not necessarily stored, and only predetermined feature quantities (e.g., only the feature quantities obtained at step S8 described as below) may be stored.

The operation at steps S1-S5 is performed on all slice images contained in one series (step S6).

When the part information on all slice images are obtained, at step S7, the part correction processing unit 25 place the part information stored in the part information storing unit 24 in the order of slices. This is because the image data generated in the modality (FIG. 1) is not necessarily sent to the image server 2 in the order of slices. The order of slices is determined based on the image position information (0020,0032): Image position (Patient) of the image incidental information. Alternatively, instead of step S7, the part information storing unit 24 may store the part information while placing them in the order of slices based on the image position information at step S5.

Then, at step S8, the part correction processing unit 25 corrects the parts tentatively determined for each slice by using part information of the plural slice images. The correction methods are the following (1)-(3), for example.

(1) Method Using Part Information of Adjacent Slices

This method is a method of correcting the part tentatively determined for a slice, based on the positional relationship with adjacent slices.

The case will be considered where the tentatively determined part is "neck" in the 1st to 5th slices, "head" in the 6th slice, "neck" in the 7th to 10th slices, "chest" in the 11th to 15th slices, "leg" in the 16th slice, "chest" in the 17th to 20th slices, and "abdomen" in the 21st to 30th slices. In this case, since the part is "neck" in the preceding and subsequent slices of the 6th slice, the determination that the 6th slice is "head" is a recognition error, and correctly "neck". Further, since the part is "chest" in the preceding and subsequent slices of the 16th slice, the determination that the 16th slice is "leg" is a recognition error, and correctly "chest". In this way, when the part tentatively determined for a slice is different from the part in the preceding and subsequent slices, the part of the slice is corrected by referring to the preceding and subsequent slices.

(2) Method Using Feature Quantities

This method is a method of correcting the part tentatively determined for a slice image, based on the change in feature quantity in the body axis direction.

FIG. 5 (a) shows feature quantities of air region in the order of slice positions (in the body axis direction), and FIG. 5 (b) shows differential values of feature quantities of air region. As shown in FIG. 5 (b), from the observation of the change in feature quantity of air region from the upper section (head side) toward the lower section (leg side) of the object, it is found that there is a location where the feature quantity abruptly starts to increase. This location is set as the start position of "chest". Further, from the observation further toward the leg side, it is found that there is a location where the feature quantity changes from decrease to increase. The location is set as the boundary between "chest" and "abdomen". In the case where there is a slice image tentatively determined as a part other than "chest" between the start position of "chest" and the boundary between "chest" and "abdomen", the part of the slice image is corrected to "chest".

(3) Method Utilizing Matching Curve

This method is a method of correcting the part tentatively determined for each slice, by referring to normal arrangement of parts in the object (e.g., human body).

Figure 6:
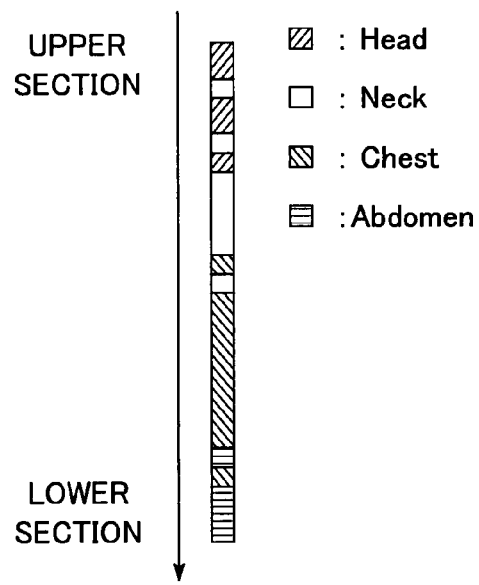
FIG. 6 is a diagram of tentatively determined parts (part recognition results) in the order of slices.

First, as shown in FIG. 6, the part tentatively determined for each slice is placed in the order of slices from the upper section (head side) toward the lower section (leg side). As shown in FIG. 6, since the region where "head" and "neck" alternately appear and the region where "neck" appears between "chests" are seen in the part recognition result, it is considered that tentatively determined parts contain many recognition errors.

Figure 7:
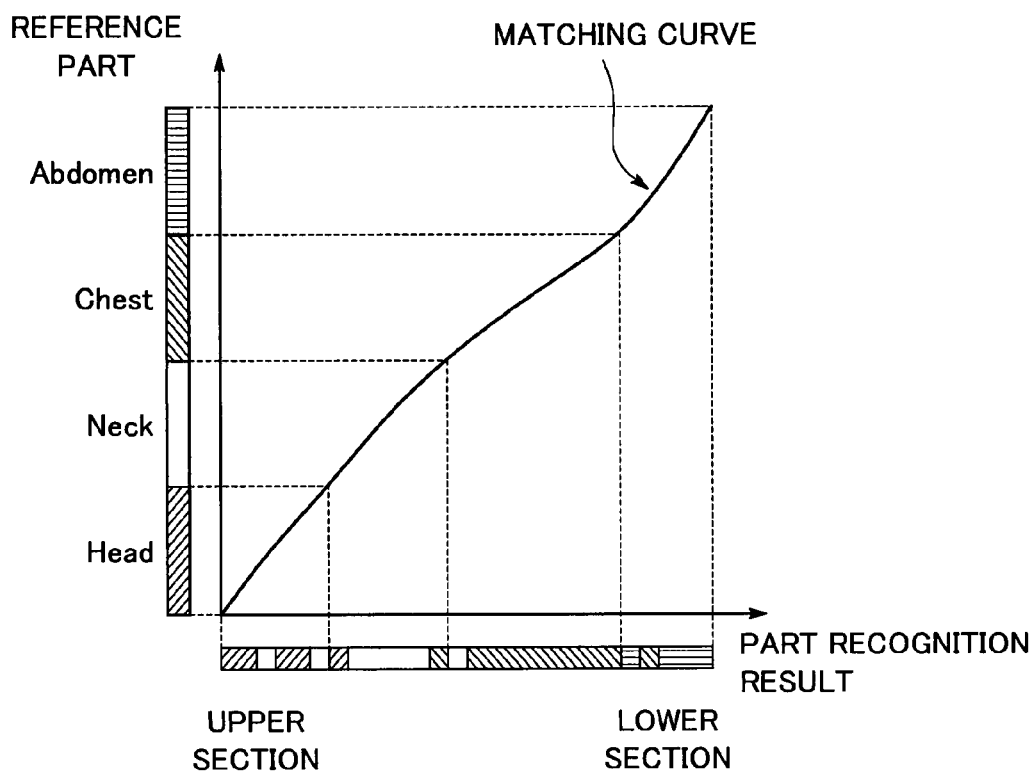
FIG. 7 shows a matching curve between the part recognition results and reference parts.

Then, as shown in FIG. 7, a matching curve between the part recognition results shown in FIG. 6 and the previously created reference parts is searched for. Here, since the parts of the human body are arranged in the order of head neck chest abdomen, the reference parts arranged in such an order are created in advance as shown by the vertical axis in FIG. 7.

At the time of searching for the matching curve, given that the cost becomes higher when there is a mismatch between the part recognition result and the reference part, a curve that has the lowest cost is obtained. As a search method, various methods for solving the optimization problem are applicable. As below, a method of searching for a matching curve by using a dynamic programming method, which is well known as one of the methods, will be explained.

Figures 8, 9, 10:
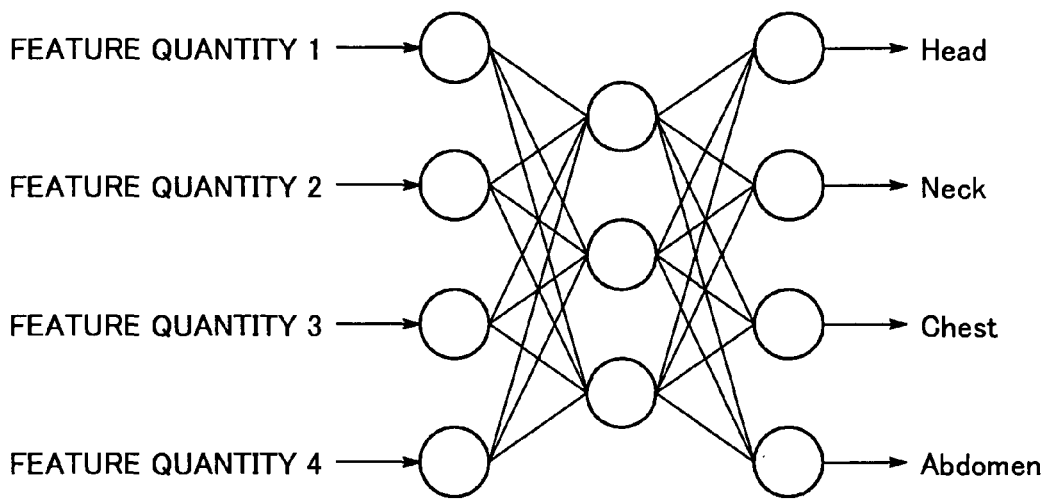
FIG. 8 is a weight map to be used for searching for a matching curve according to a dynamic programming method.
FIG. 9 is a cost map to be used for searching for a matching curve according to the dynamic programming method.
FIG. 10 is a diagram for explanation of a method of tentatively determining parts by using the neural net.

First, a weight map as shown in FIG. 8 is created. In FIG. 8, the columns correspond to slice numbers and rows correspond to parts. In this weight map, the tentatively determined parts are set such that the weights are zero (areas enclosed by heavy lines). For example, with reference to FIG. 6, the first slice is tentatively determined as "head", and the value of the cell of the "head" of the slice number "1" in the weight map is set to "0.0". Further, values of other cells are set larger than zero. Specifically, in the case where the certainty factor has been calculated for each slice image, the value of the difference between this certainty factor and the certainty factor of the tentatively determined part may be set, or a predetermined value other than the value may be set.

Then, a cost map as shown in FIG. 9 is created. In FIG. 9, the cost of each cell (n,m) is set as follows. Here, "n" indicates the slice number and "m" indicates the part number (1: Head, 2: Neck, 3: Chest, 4: Abdomen).

(1,1): Value of (1,1) in weight map (see FIG. 8)

(n,1): Value of (n−1,1) in weight map+Predetermined value (1,m): Value of (1, m−1) in weight map+Predetermined value (n,m): Minimum value among the following (i)-(iii)
  (i) Value of (n−1, m$^{-1}$) in cost map+Value of (n,m) in weight map
  (ii) Value of (n,m−1) in cost map+Value of (n,m) in weight map+Predetermined value
  (iii) Value of (n−1,m) in cost map+Value of (n,m) in weight map+Predetermined value Then, the surrounding minimum values are sequentially traced from right to left on the cost map. Thereby, a correspondence map of slice numbers to parts is created.

As shown in FIG. 7, the correction of parts is performed by replacing the tentatively determined parts to corresponding parts in the reference parts based on the matching curve obtained as described above.

With reference to FIG. 3 again, at step S8, the part correction processing unit 25 outputs the corrected part information as image incidental information to the storage unit 13 and allows the storage unit to store the information. The part information outputted from the part recognition unit 12 may be managed by an image information database, or written as tags in the image data that have been already stored in the storage unit 13.

As explained above, according to the embodiment, after the part recognition is performed for each of the plural slice images contained in one series, the part information of each slice is corrected by using the correlation of part information on plural slices. The advantage of performing part recognition through two stages is as follows. That is, part recognition processing can be started without waiting the input of all image data of one series to the server 2, and therefore, part recognition processing results can be obtained at a relatively high speed. Further, the part recognition processing result for each slice is corrected based on the three-dimensional information of the object represented by the set of plural slice images, and therefore, major part recognition errors can be reduced. Thus, efficient and correct part recognition can be performed.

The part information obtained by the part recognition processing may be utilized for recognition of the body part such as organs, or utilized as preprocessing for performing alignment of plural images imaged on the same object at different times, for example. For example, when the past image and the current image are compared and observed, or a difference image between them is generated, the accurate alignment is necessary.

Further, the display protocol when displayed on the image display terminal 3 (FIG. 1) may be switched based on the part information obtained by the part recognition processing.

Here, in the embodiment, the part recognition unit 12 (FIG. 2) performs part recognition processing on all inputted slice images. However, DICOM tags may be referred to before the part recognition processing is started, and the part recognition processing may be performed only on the slice images not having information representing the imaging part ((0018, 0015): Body Part). This is because the part may be added in the imaging stage.

Alternatively, the part recognition unit 12 may perform the part recognition processing while thinning the continuously inputted slice images at predetermined slice intervals. In this case, the entire processing can be made faster. Furthermore, the part recognition unit 12 may perform the part recognition processing only on a predetermined range of the continuously inputted slice images. For example, when the subject of diagnosis is the abdomen of the object, it is sufficient that the start region of the abdomen (or the mixture region of the chest and abdomen) can be recognized. In this case, the part recognition processing may be omitted for the range that is obviously considered as "leg" from the information representing the three-dimensional coordinates of the slice image (DICOM tag (0020,0032): Image position (Patient)), for example.

Further, in the embodiment, the score table is used when the part of the body shown on the slice is tentatively determined at steps S3 and S4, however, parts may be recognized by utilizing a machine learning method such as the neural network instead.

Here, a method of tentatively determining the part by utilizing the neural network will be explained.

As shown in FIG. 10, the feature quantities of the body represented in the slice images (e.g., the feature quantities (A)-(C) explained at step S2) are inputted to the neural net. Then, the neural net is allowed to learn such that "1" is outputted for the part matching the part shown in the slice image and zero is outputted for other parts. For example, when the head is shown in the slice image, the output of "Head" is set to "1", and the outputs of "Neck", "Chest" and "Abdomen" are set to zero. By using thus learned neural network, the parts corresponding to the inputted feature quantities are acquired.

Figure 11:
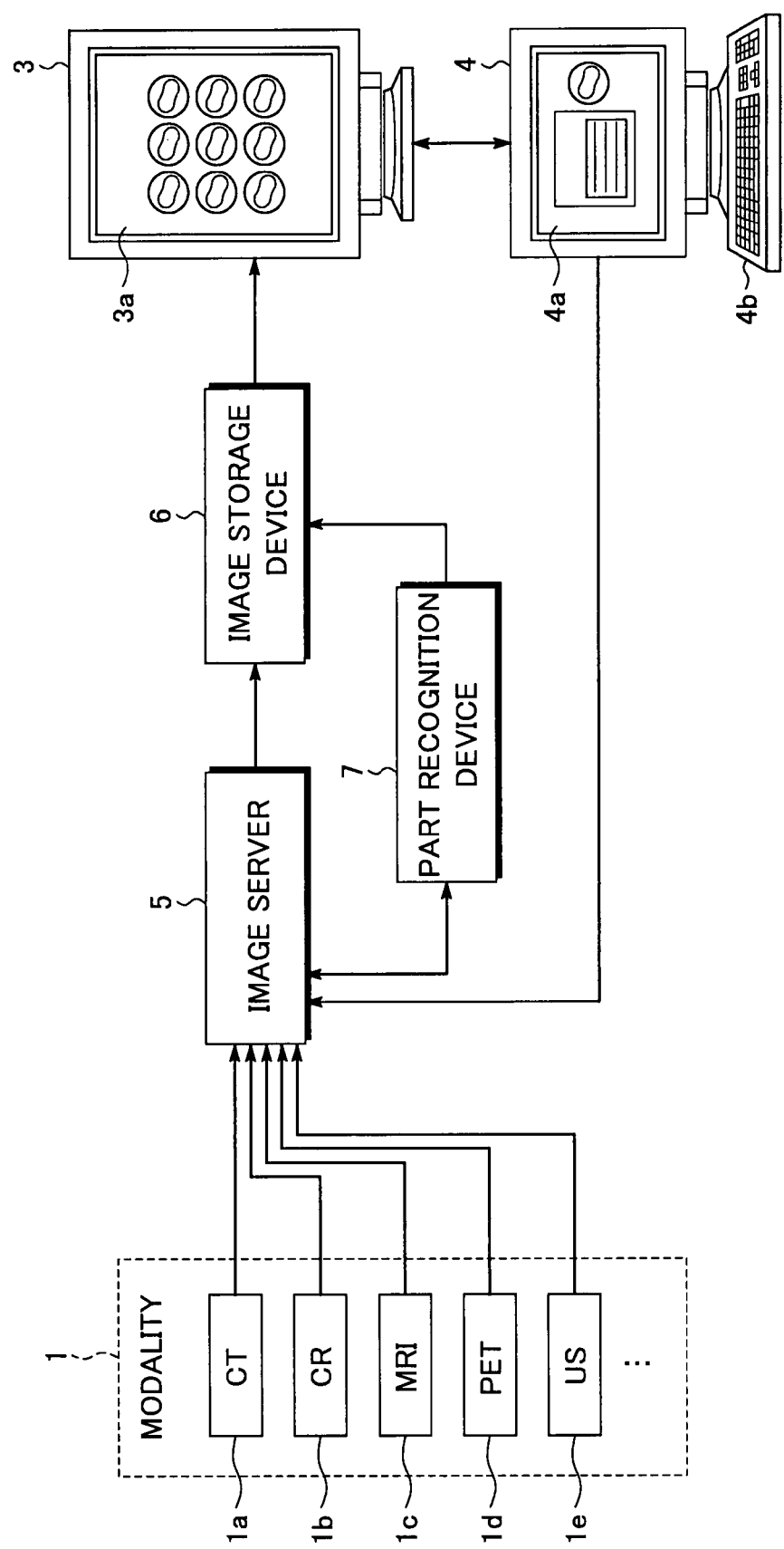
FIG. 11 shows a configuration of a medical image imaging system containing a medical image part recognition apparatus according to the second embodiment of the present invention.

Next, a medical image part recognition apparatus according to the second embodiment of the present invention will be explained. FIG. 11 is a block diagram showing a configuration of a medical image imaging system containing the medical image part recognition apparatus according to the embodiment.

As shown in FIG. 11, this system includes an image server 5, an image storage device 6, and a part recognition device 7 in place of the image server 2 shown in FIG. 1. These devices 5-7 are compliant with the DICOM standard. Other configuration is the same as that in the system shown in FIG. 1.

The image server 5 is a PACS server for storing and managing image data outputted from the modality 1. The image server 5 allows the image storage device 6 to store the image data inputted from the modality 1. Further, the image server 5 outputs the image data to the part recognition device 7 for part recognition when the image incidental information of the image data does not contain the information representing imaging part ((0018,0015): Body Part). Furthermore, the image server 5 controls the image storage device 6 to output the image data stored in the image storage device 6 to the image display terminal 3 according to the request of the information image interpretation terminal 4.

The image storage device 6 is, for example, a hard disk drive connected to the image server 5. Alternatively, as the recording medium, an MO, an MT, a RAM, a CD-ROM, a DVD-ROM, or the like may be used. In this case, a drive unit for driving those recording media is connected to the image server 5. Alternatively, an image storage unit may be built in the image server 5.

The medical image part recognition device (hereinafter, simply referred to as "part recognition device") 7 is a device for recognizing which part of the object is imaged in each axial image based on plural axial images represented by one series of image data and generating part information. The part recognition device 7 is configured by a personal computer (PC), for example. Further, the part recognition processing function and operation in the part recognition device 7 are the same as those in the part recognition unit 12 shown in FIGS. 1 and 2.

In the embodiment, the part recognition device 7 is configured by a PC, and thereby, the part recognition processing function can be easily provided to existing medical image imaging systems. Therefore, efficient part recognition processing can be performed while existing equipment is used.

In the embodiment, the part recognition device 7 outputs the generated part information and allows the image storage device 6 to store it, however, the part information may be stored in a storage unit (e.g., a hard disk) built in the part recognition device 7.

In the above explained first and second embodiments, the part recognition unit 12 (FIG. 1) and the part recognition device 7 (FIG. 11) perform part recognition processing on the image data directly inputted from the modality 1 to the image server 2 or 5. However, the image data that has been generated in the modality 1 and once stored in a recording medium may be loaded in the image server 2 or 5 or the part recognition device 7 for part recognition processing.

Figure 12:
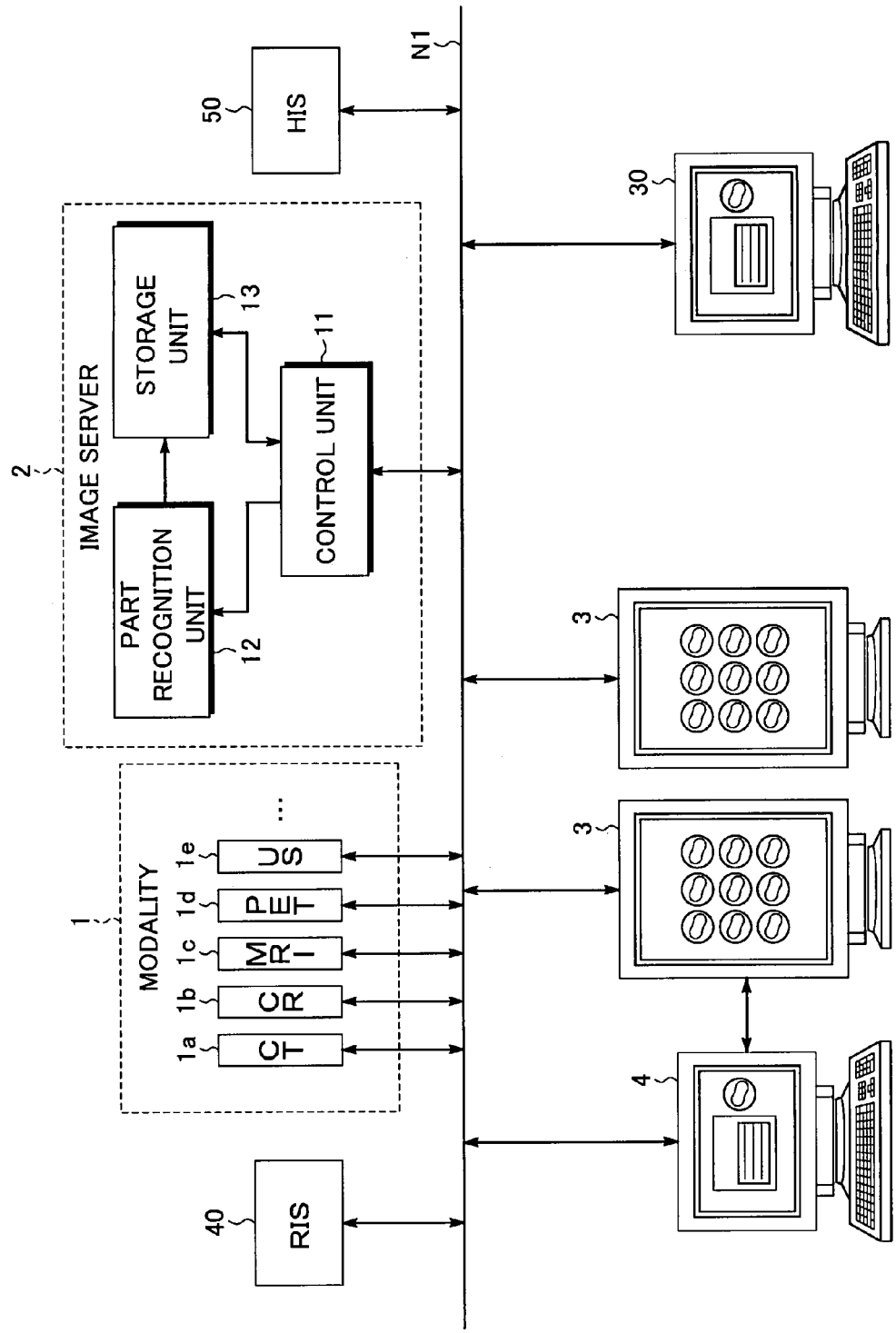
FIG. 12 shows another configuration example of the medical image imaging system containing the medical image part recognition apparatus according to the first and second embodiments of the present invention.

Next, another configuration example of the medical image imaging system containing the medical image part recognition apparatus according to the first and second embodiments of the present invention will be explained with reference to FIG. 12. As shown in FIG. 12, the modality 1, the image server 2, the image display terminal 3, and the image interpretation terminal 4 are connected to one another via network N1 such as a LAN (local area network) in the system. Alternatively, in place of the image server 2, the image server 5, the image storage device 6, and the part recognition device 7 shown in FIG. 11 may be connected to the network N1. Further, a terminal 30 installed in each department, an RIS (radiology information system) 40, and an HIS (hospital Information System) 50 may be connected to the network N1.

As shown in FIG. 12, since the image server 2 (or the part recognition device 7) having the medical image part recognition function is connected to the network N1, the image data after part recognition can be utilized in various terminals (e.g., the image interpretation terminal 4 or each department terminal 30), and therefore, efficient medical diagnoses can be made.

The invention claimed is:

1. A medical image part recognition apparatus for recognizing a part of a body shown in each of plural axial images based on image data representing one series of axial images obtained by imaging an object to be inspected, said apparatus comprising:

part determining means for calculating feature quantities expressing features of a body shown in each of plural axial images, calculating part certainty factors expressing likelihood that a part of the body shown in each of the plural axial images corresponds to each of plural reference parts for the object based on the feature quantities, and tentatively determining the part of the body shown in each of the plural axial images from among the plural reference parts based on the part certainty factors; and part correcting means for correcting the part tentatively determined for at least one axial image by said part determining means by creating a cost map in which a cost is set for each combination of the plural axial images and the plural reference parts based on the part certainty factors and searching for a matching curve between tentatively determined parts and the plural reference parts in a normal arrangement order in the object based on the cost map to obtain the matching curve having a lowest cost.

2. The medical image part recognition apparatus according to claim 1, wherein said feature quantities includes a feature quantity of air region of the body, and a feature quantity of bone region of the body.

3. The medical image part recognition apparatus according to claim 1, wherein said part determining means tentatively determines the part of the body shown in each of the plural axial images, by using a score table in which likelihoods of parts corresponding to the feature quantities are converted into numerical values.

4. The medical image part recognition apparatus according to claim 1, wherein said part determining means tentatively determines the part of the body shown in each of the plural axial images, by using a machine learning method including a neural network based on the calculated feature quantities.

5. A medical image part recognition program embodied on a non-transitory computer-readable medium and to be used in an apparatus for recognizing a part of a body shown in each of plural axial images based on image data representing one series of axial images obtained by imaging an object to be inspected, said program allowing a CPU to execute the procedures of:

(a) calculating feature quantities expressing features of a body shown in each of plural axial images, calculating part certainty factors expressing likelihood that a part of the body shown in each of the plural axial images corresponds to each of plural reference parts for the object based on the feature quantities, and tentatively determining the part of the body shown in each of the plural axial images from among the plural reference parts based on the part certainty factors; and (b) correcting the part tentatively determined for at least one axial image at procedure (a) by creating a cost map in which a cost is set for each combination of the plural axial images and the plural reference parts based on the part certainty factors and searching for a matching curve between tentatively determined parts and the plural reference parts in a normal arrangement order in the object based on the cost map to obtain the matching curve having a lowest cost.

6. The medical image part recognition program according to claim 5, wherein said feature quantities includes a feature quantity of air region of the body, and a feature quantity of bone region of the body.

7. The medical image part recognition program according to claim 5, wherein procedure (a) includes tentatively determining the part of the body shown in each of the plural axial images, by using a score table in which likelihoods of parts corresponding to the feature quantities are converted into numerical values.

8. The medical image part recognition program according to claim 5, wherein procedure (a) includes tentatively determining the part of the body shown in each of the plural axial images, by using a machine learning method including a neural network based on the calculated feature quantities.

9. The medical image part recognition apparatus according to claim 1, wherein said part correcting means searches for the matching curve while increasing the cost when there is a mismatch between the tentatively determined part and the reference part.

10. The medical image part recognition apparatus according to claim 1, wherein said part determining means tentatively determines, when the object is a human body, the part of the body shown in each of the plural axial images from among parts including least two of head, neck, chest, abdomen, pelvis, leg, boundary regions of those parts, and overlapping regions of plural regions thereof.

11. The medical image part recognition program according to claim 5, wherein procedure (a) includes searching for the matching curve while increasing the cost when there is a mismatch between the tentatively determined part and the reference part.

12. The medical image part recognition program according to claim 5, wherein procedure (a) includes tentatively determining, when the object is a human body, the part of the body shown in each of the plural axial images from among parts including at least two of head, neck, chest, abdomen, pelvis, leg, boundary regions of those parts, and overlapping regions of plural regions thereof.

* * * * *